US008350804B1

(12) United States Patent
Moll (10) Patent No.: US 8,350,804 B1
(45) Date of Patent: Jan. 8, 2013

(54) THOUGHT CONTROLLED SYSTEM (76) Inventor: Edward W. Moll, Mt. Laurel, NJ (US)

( * ) Notice: Subject to any disclaimer, the term of this patent is extended or adjusted under 35 U.S.C. 154(b) by 1826 days.

(21) Appl. No.: 08/835,625

(22) Filed: Apr. 9, 1997

Related U.S. Application Data (60) Provisional application No. 60/015,243, filed on Apr. 10, 1996.

(51) Int. Cl.
G09G 5/00 (2006.01)
(52) U.S. Cl. ............................ 345/156; 341/21; 600/545
(58) Field of Classification Search .................. 345/156, 345/157, 158; 341/21, 32; 600/544, 545, 600/546; 340/825.19; 128/905; 364/DIG. 1
See application file for complete search history.

(56) References Cited

U.S. PATENT DOCUMENTS

| | | | | |
|---|---|---|---|---|
| 4,651,145 A | * | 3/1987 | Sutter | 340/825.19 |
| 4,757,438 A | * | 7/1988 | Thatte et al. | 364/DIG. 1 |
| 4,928,704 A | * | 5/1990 | Hardt | 600/545 |
| 4,949,726 A | * | 8/1990 | Hartzell et al. | 600/544 |
| 5,016,213 A | | 5/1991 | Dilts et al. | 364/410 |
| 5,241,621 A | * | 8/1993 | Smart | 395/51 |
| 5,313,944 A | | 5/1994 | Crowley et al. | 600/409 |
| 5,325,133 A | * | 6/1994 | Adachi | 345/158 |
| 5,367,315 A | * | 11/1994 | Pan | 345/156 |
| 5,377,100 A | | 12/1994 | Pope et al. | 364/410 |
| 5,379,409 A | * | 1/1995 | Ishikawa | 345/156 |
| 5,406,957 A | * | 4/1995 | Tansey | 600/544 |
| 5,465,729 A | * | 11/1995 | Bittman et al. | 600/545 |
| 5,474,082 A | * | 12/1995 | Junker | 345/157 |
| 5,546,943 A | * | 8/1996 | Gould | 600/425 |
| 5,594,849 A | * | 1/1997 | Kuc et al. | 395/135 |
| 5,638,826 A | * | 6/1997 | Wolpaw et al. | 600/544 |
| 5,844,824 A | * | 12/1998 | Newman et al. | 345/156 |
| 5,914,701 A | * | 6/1999 | Gersheneld et al. | 345/156 |
| 6,024,700 A | * | 2/2000 | Nemirovski et al. | 600/300 |

FOREIGN PATENT DOCUMENTS

GB 2220089 A * 12/1989

OTHER PUBLICATIONS

Atwood, Brett. Computer programs use brain power. (MindDrive Technology). Oct. 5, 1996. Billboard, v108, n40, p. 80(1).*

(Continued)

*Primary Examiner* — John A Tweel, Jr.
(74) *Attorney, Agent, or Firm* — Caesar, Rivise, Bernstein, Cohen & Pokotilow, Ltd.

(57) ABSTRACT

A system for controlling a computer by thoughts in the user's brain. The system applies stimuli of the brain via magnetic source imaging (MSI) for controlling the computer. Patterns of brain stimuli are recorded along with the particular thoughts that produced them and these thoughts are interpreted as functions for controlling the computer in much the same way as inputs from a keyboard or mouse. Criteria of acceptance of thought stimuli are generated by the system. Body stimuli, in addition to the brain stimuli, are monitored and used by the system. A user profile is maintained and displayed along with selected pictures for assisting with stimuli/thought pattern utilization. Artificial intelligence is used to enhance stimuli selection, human factors and reliability, as well as analyzing past errors, adverse occurrences and performance. Analyses and summaries are produced by the system for psychiatrists, psychologists, researchers and users to study system enhancement, biofeedback, psychological impact, brain activity, localization and identification of feelings and thought patterns. Stimuli are monitored at brain and body locations. Various functions are applied to animals.

19 Claims, 3 Drawing Sheets

OTHER PUBLICATIONS

Johnson, R. Colin. 'Mind-reading' software runs on standard PC. Sep. 30, 1996. Electronic Engineering Times. p. 49.*

Smotroff, Mark. The Other 90% Technologies Inc. breaks through the thought barrier with MindDrive. Jun. 16, 1995. Business Wire, s1, p. 1.*

Application of Multichannel Systems in Magnetocardiography, 1992 Elsevier Science Publishers Germany.

Magnetocardiography in Combination with MRI: Verification of Localization accuracy with a nonmagnetic pacing catheter, 1992 Elsevier Science Publishers Germany.

First Experiences from Clinical Installations of Biomagnetic Multi-Channel Systems, 1993 Siemens Medical Engineering Group, Germany.

Krenikon: A Diagnostic Tool for the Measurement of Biomagnetic Fields, 1995 Siemens Medical Engineering Group Germany.

Reconstruction of current densities with anatomical constraints, 1992 Elsevier Science Publishers Germany.

The Factor Analysis Used to Improve the Dipole-Density-Plot (DDP) to Localize Focal Concentrations of Spontaneous Magnetic Brain Activity, Oct. 1992 Biomedical Engineering (in press).

Effect of Biomagnetic Signal Processing on Source Localization Estimated by Means of Statistical Source Distributions, 1992 IEEE.

Improvement of Neuromagnetic Localization by MCG Artifact Correction in MEG recordings, 1992 Elsevier Science Publishers Germany.

Multichannel Biomagnetic System for Study of Electrical Activity in the Brain and Heart, 1990 Radiology.

Progress in Biomagnetic Imaging of Heart Arrhythmias, 1991 Frontiers in European Radiology.

Magnetic Interictal Epileptic Brain Activity Localized by Using the Single or the Ttwo Dipole Model, Oct. 1992 Biomedical Engineering (in Press).

Beyond 2000, Episode #205, Eye Position sensing of Canon Camcorder automated focus, Feb. 1996 Discovery Channel (Video Tape Recording).

Mind Reading—Fact or Fiction? Oct. 1995 The Sunday Times.

The First Computer Products Operated Only by Human Thought, Apr. 1996 The Other 90% Technologies, Inc. (Brochure).

Magnes-WH Whole Head Magnetic Source Imaging System, Jan. 1995 Biomagnetic Technologies, Inc. Technical Specification.

Magnes—Magnetic Source Imaging, Jan. 1995 Biomagnetic Technologies, Inc. (Brochure).

Schneider et al., *Multichannel Biomagnetic System for Study of Electrical Activity in the Brain and Heart*, Radiology 176, 1990, pp. 825-830.

Hari, *Human Cortical Functions Revealed by Magnetoencephalography*, Progress in Brian Research vol. 100, 1994, pp. 163-168.

Böcker et al., *A spatial-temporal dipole model of the readiness potential in humans. I Finger movement*, Electroenephalography and Clinical Neurophysiology 91, 1994, pp. 275-285.

Böcker et al., *A spatial-temporal dipole model of the readiness potential in humans. II Foot movement*, Electroenephalography and Clinical Neurophysiology 91, 1994, pp. 286-294.

Cheyne et al., *Neuromagnetic fields accompanying unilateral finger Movements:pre-movement and movement-evoked fields*, Experimental Brain Research 78, 1989, pp. 604-612.

Cheyne et al., *Homuncular organization of human rotor cortex as indicated by neuromagnetic recordings*, Neuroscience Letters 122, 1991, pp. 17-20.

Ikeda et al.; *Movement-related potentials associated with bilateral simultaneous and unilateral movements recorded from human supplementary motor area*, Electroenephalography and Clinical Neurophysiology 95, Nov. 1995, pp. 323-334.

Kristeva et al., *Neuromagnetic fields accompanying unilateral and bilateral voluntary movements: topography and analysis of cortical sources*; Electroenephalography and Clinical Neurophysiology 81, 1991, pp. 284-298.

Tucker, *Spatial sampling of head electrical fields: the geodesic sensor net*, Electroenephalography and Clinical Neurophysiology vol. 87, 1993, pp. 154-163.

Van Petten, *Words and sentences: Event-related brain potential measures*, Psychophysiology 32, 1995, pp. 511-525.

Walter et al., *Individual Somatotopy of Primary Sensorimotor Cortex Revealed by Intermodal Matching of MEG. PET. and MRI*, Brain Topography vol. 5, No. 2, 1992, pp. 183-187.

* cited by examiner

THOUGHT CONTROLLED SYSTEM

RELATED APPLICATIONS

This is a utility application based upon provisional patent application Ser. No. 60/015,243, filed Apr. 10, 1996, entitled THOUGHT CONTROLLED SYSTEM. Applicant hereby incorporates the entire subject matter of the '243 provisional application into this utility application and also claims the benefit of the filing date of the '243 provisional application for this utility application.

BACKGROUND OF THE INVENTION

The present invention has as its principal objective the control of a computer caused by stimuli in the body and brain. The present invention is thus primarily concerned with the mode of finding the radiating properties of the human brain and selectively applying these findings to the control of computerized devices. Additionally, stimuli of other places of the body are included in these teachings.

It has been known for nearly 30 years that the electrical activity of nerves and muscle cells create electric energy and magnetic fields that can be measured. To draw conclusions about the electric functions of organs from those fields, however, one has to know the spatial and temporal distribution of the biomagnetic fields. In 1988, the first biomagnetic multichannel system was introduced for clinical research enabling the acquisition of complete magnetic field patterns, noninvasively and in real time. The latest technology using superconductive gradiometers and SQUIDs (Superconducting Quantum Interference Device) were employed in this device. "The feasibility for noninvasively analyzing the cardiac excitation path, especially in localizing the accessory bundle in Wolff Parkinson White syndrome and regions causing extrasystoles and tachycardia, had already been demonstrated. An example of localization of epileptic foci in the interictal state, or slow wave activity in the brain." Ref. R. Helle and A. Oppelt, FIRST EXPERIENCES FROM CLINICAL INSTALLATIONS OF BIOMAGNETIC MULTICHANNEL SYSTEMS, Siemens Medical Engineering Group, Henkestr. 127, D-W-8520, Erlangen, Germany.

The activity of biological cells, e.g. nerves, muscle fibers and brain matter, is electric in origin. In a physical context, excited cells can be considered as galvanic elements situated in a conductive medium—the body. Sometimes bundles of cells are active simultaneously. The activity of these cells can be modeled by an equivalent current dipole (i.e., a small battery), consisting of a current source and sink, separated by a short distance.

A current dipole sends a known volume of current into the conductive surrounding. When this current reaches the surface of the body, electric potentials can be measured with electrodes. Medical diagnosis measurements in the heart are shown on an electrocardiogram (ECG). Those in the head are shown on an electroencephalogram (EEG). ECGs and EEGs provide information on the time course of the current sources in the body. However, sufficient localization accuracy can not be attained with these methods due to the strong influence of local tissue conductivity, which can vary considerably.

The strength of the electric fields being measured generally depends on the strength of the source and on the position of the electrodes with respect to the source. Since the conductivity of different tissues normally is not known, localization of a current dipole in the body is only possible with electrodes if they are brought very close to the site of the electric activity. For example, to determine the origin of electric activity in the human heart, one has to work with catheters—an invasive procedure. A goal of this invention is to primarily provide thought control with noninvasive techniques. Likewise for the human brain, invasive procedures here create a much greater risk.

Every electric current is surrounded by a magnetic field which is, in essence, unaffected by the electromagnetic properties of tissue. Research into the localization of current dipoles using magnetic field measurements was performed as early as 1963. Ref. W. Moshage, S. Achenbach, S. Schneider, K. Gohl, K. Abraham-Fuchs, R. Graumann, and K. Bachmann, APPLICATION OF MULTICHANNEL SYSTEMS IN MAGNETOCARDIOGRAPHY, 1992 Elsevier Science Publishers B.V., Biomagnetism: Clinical Aspects. M. Hoke, Editor. The magnetic field, generated by current dipole in the human body and measured outside of the body, has two fields of activity: one originates from the current dipole itself and the other originates from the volume currents. While the influence of the first field of activity can easily be calculated from the Biot-Savart law, the second depends on the paths of the currents in the body.

In order to localize the current dipole, it is necessary to know the distribution of the magnetic field being measured. Generally, one measures a north pole where the magnetic field lines leave the human body and a south pole where they enter again. The current dipole lies in the center, between the two poles. The depth is determined by the distance between the two poles: the further the two poles are apart, the deeper the dipole is situated.

It is known that there are areas of the brain that emit magnetic energy in response to the thinking process. We know from ECG's and EEG's, monitors can record body changes. Further, Biofeedback studies and empirical data show some of the functional control that is possible with the brain and body.

Also known is Magnetic Source Imaging (MSI) equipment in use today, such as the "Krenicon" and the "Magnes," which noninvasively monitor and record brain activity. This has many uses, including use as a diagnostic tool for brain disorders such as epilepsy. Today's MSI are multichanneled and include high pass filters, anti-aliasing filters and 14 bit A/Ds with generally a 4 kHz sampling rate. Siemens' (Germany) Krenicon has 127 output channels which can be directed to 127 areas of the brain. It can show medical imaging and a journey into the brain to cure a patient with epilepsy. The journey depended on Siemens' Krenicon, cooled by liquid helium, to detect magnetic signals one billion times smaller than the earth magnetic field.

In the U.S., Biomagnetic Technologies, Inc.'s Magnes offers 147 output channels. Ref. W. Moshage, S. Achenbach, A. Weikl, K. Gohl, K. Abraham-Fuchs, S. Schneider and K. Bachmann PROGRESS IN BIOMAGNETIC IMAGING OF HEART ARRHYTHMIAS Frontiers in European Radiology, Vol. 8, Eds Baert/Heuck, Springer-Verlag, Berlin, Heidelberg 1991.

The advantage of MSI is that it is noninvasive and that this invention may require stimulus from parts of the brain that may be quite a distance from the surface and at a variety of locations, e.g., electrodes may not be practical by themselves. The mobility of this "Thought Controlled System" (TCS), FIG. 1 will become greater as the technology advances and as TCS is mass produced.

There are difficulties encountered when using today's MSI technology. However, they are being overcome by numerous organizations throughout the world. As more and more MSI equipment is placed in service and as the race for economic feasibility and technical advancements are pursued, this invention becomes more attractive. Publications say the race is on among many companies to bring MSI technology to a stage where it is miniaturized, inexpensive and insensitive to interference. Furthermore, the main features may be proven by sensing with less expensive techniques until MSI becomes cost effective. Each advance is contributing toward a more economically feasible TCS as presented here. A few examples of efforts where challenges are being met are:

Two Krenicons are installed in hospitals for clinical research as well as for establishing the clinical relevance of biomagnetic diagnosis. In the Biomagnetic Center of the University of Erlangen (Germany), biomagnetic investigations are performed regularly in the field of cardiology, epilepsy and other neurologic disorders, such as transitory ischemic attacks and stroke. At the Karolinska Hospital, Stockholm, epilepsy is diagnosed and new methods for treating biomagnetically localized foci with high energy radiation are explored. The investigation of ventricular late fields started 1993. See earlier Ref. to R. Helle and A. Oppelt. Another challenge with current MSI equipment found in the same Ref. (Pg. 2, Col. 1) is: "Selecting a site requires special attention in order to keep the influence of moving iron masses such as cars and elevators to an acceptable minimum. Installation includes a special shock proof concrete foundation for a shielded room and an active shielding loop. Large consumers of electric energy like a subway can cause considerable interference, even over large distances, especially if the current varies slowly as the shielding effect of the chamber is lowest in the range below about 0.1 Hz."

Spatial resolution of the biomagnetic localization is dependant on identifying and compensating. " . . . sources of localization errors (may be) . . . coordinate transfer into the magnetic resonance (MR) image, system noise, 'biologic' noise from electrical background activity of the human body, and modeling inaccuracies. Influence of system noise with phantoms, and an error of 1-2 mm was found. The reproducibility of the head position in the MEG device and the MR imaging system is typically 2 mm for a point in the temporal region and about 4 mm for a point in the occipital region" Ref. Siefried Schneider. Ph. D., et al MULTICHANNEL BIOMAGNETIC SYSTEM FOR STUDY OF ELECTRICAL ACTIVITY IN THE BRAIN AND HEART, Radiology 1990; 176-825-830. This is being overcome with technology and will be further reduced with the use of a "helmet" system mentioned later in this application.

As TCS costs are reduced and become used more by one individual, the site locations will be less often in hospitals and large metropolitan areas but rather suburban and rural residential areas. Also, additional noise reduction techniques are being developed using signal processing and signal enhancing as mentioned later.

Signal processing is used for enhancing the evaluation of data amid noisy environments and to correct physiological interference. Signal preprocessing is performed on the biomagnetic data prior to source localization. For example, the signal preprocessing may include algorithms for noise suppression or separation of signals from different sources.

The end result of data evaluation in biomagnetic imaging is the reconstruction of bioelectric activity from the measured field distribution in time and space. Such a procedure may consist of several signal-processing steps: a) correction of each measurement channel, b) averaging of several cycles to improve signal-to-noise ratio (SNR), c) definition of a physiological model, d) reconstruction of the source of interference for use in noise and echo cancellations, e) automated or semi-automated validation of the reconstruction result, and f) viewing and comparing reconstructed three dimensional localization with other imaging methods.

Biomagnetic image reconstruction is critically dependent on signal fidelity. Signal distortions, such as dc offset and low frequency (i.e., below 0.1 Hz) noise, have to be removed without imposing new distortions. Dc offset and low frequency noise stem mainly from electronic noise in high-gain amplifiers, thermal magnetic noise in surrounding materials, movement of the torso, and mechanical vibrations. In some cases, the signal of interest is also influenced by a preceding physiological activity from organs, such as the user's heart. Special correction algorithms are used for these cases and, depending on the type of interference, different baseline correction techniques are applied.

The word "artifacts" is used in the field of body measurement sciences to refer to additional signals (usually interfering) resulting from the functions of body parts other than the signal of interest. Webster defines it "a characteristic product of human activity." The Magnetoencephalograph (MEG) can pick up magnetic signals produced by the heart with a signal strength which may be equal to or even greater than the neuromagnetic signals of interest. These undesirable signals, called artifacts, in MEG data may contaminate the signal. Sporadic events may not be recognized or classified correctly and the error in source localization can increase. In this instance a correction algorithm is utilized to suppress artifacts produced by the heart. Ref. K. Abraham-Fuchs et al., IMPROVEMENT OF NEUROMAGNETIC LOCALIZATION BY MCG ARTIFACT CORRECTION IN MEG RECORDINGS, Pg. 1787, 1992, Elsevier Science Publishers B.V. An example of a heart artifact removal algorithm is to make use of the fact that the user's heart is electrically inactive during a portion or portions of the heart cycle. A time window of the preceding cycle is defined and the mean of the signal during the appropriate portion or portions is subtracted from each stimulus channel individually. This theory is supported on Pg. 6 of earlier Ref. to W. Moshage, "PROGRESS IN BIOMAGNETIC . . . " 1991. Care must be taken however, (such) "algorithms usually do not achieve their purpose ideally, but leave a residual of distortion in the data, or even may introduce new distortions." Ref. Klaus Abraham-Fuchs et al., EFFECT OF BIOMAGNETIC SIGNAL PROCESSING ON SOURCE LOCALIZATION ESTIMATED BY MEANS OF STATISTICAL SOURCE DISTRIBUTIONS 0-7803-0785-2/92$03.00 IEEE (Pg. 1768 Col. 1, Abstract).

The state of the art of improving signal recognition and identifying the location (Localizing) of areas, specific parts and especially specific thoughts is such that localizing can be performed in varying degrees of accuracy. Companies throughout the world recognize the need for improvement and are in a race to improve the state of the art. The utility, efficiency and attraction of thought control will constantly increase with advances in signal recognition.

Having said all this about improving the biomagnetic image reconstruction to a point of fine precision, much of the sophistication and expensive components may be eliminated when the TCS is applied to specific tasks. These low cost systems are arrived at with experimentation by the user combined with utilizing empirical history data. This occurs because of the unique characteristics exhibited as unexpected thought patterns are identified for each individual and chosen for control. Image reconstruction is an attractive and often necessary tool for experiments and configuring systems. However, after the system is configured and the user is completely checked out, the image reconstruction feature can be eliminated. This is useful when economy is paramount.

TCS offers a valuable contribution to humanity in that of offering paralysed individuals a means for controlling computerized devices without the need for physical movement. Of particular benefit would be a case where, even with total physical paralysis, a person could do a full day's work at a computer; or communicate; or socialize; etc.; etc.

Although it will be appreciated that the present invention is not limited to such applications, examples of applications in which the present invention is particularly useful are as follows:

TCS could be of assistance to persons who cannot use their hands, arms or any other part of their body to perform work or otherwise perform computer control. This invention would allow a quadriplegic to put in a full days work including but not limited to computer control of production line devices, doing visual sorting and other tasks.

This thought controlled system (TCS) will enable a paralyzed person to control automation in the home, control the movement of an automated wheelchair and control other assistance devices.

The speed alone may be sufficient justification for employing a TCS. A Ref. to substantiate the speed potential is, "With the possibility of localizing electrical sources (dipoles) with a time resolution of milliseconds, biomagnetic evaluation has the potential to become a valuable tool in functional diagnosis, especially in combination with anatomic imaging" See earlier (Pg. 6) Ref. to Siefried Schmeider. Ph.D.

The thought controlled system will be of assistance to a person who cannot speak. The TCS method used may be similar to typing into a computer with a keyboard where the text is converted to an audio output. In order to accomplish this with fewer key stroke equivalents, the user might be trained in the language of a court reporter's shorthand typewriter. Speeds are attained at least as fast as a person speaks. This, again, depends on the number of reliable stimuli that the MSI can reliably produce from the electrical impulses of the user's brain.

Using thought controlled systems, handicapped persons will continually uncover new and additional information concerning detectable stimulus. The handicapped have a great appetite for improving the quality of their life. It is envisioned that clubs and organizations will be formed of this elite group and that their accomplishments will be monitored by the medical profession for unprecedented scientific advancements. Improvements to society will be furthered as TCSs are shared during off hours and around the clock by people intent on contributing experimental time. All these incidents will proliferate through interest groups and user group organizations as technology advances to produce more affordable systems.

Other candidates for uses of a TCS may be the military, industrial production lines, the games industry, and researchers in: Biofeedback, Psychiatry, Metaphysics, Subconscious thought analysis, Source of specific thoughts, Patients' "self data finding", Patient therapy, and Human interfaces for the phenomenal speed potential.

A reference for brain activity controlling a computer is a video game by Pope et al, U.S. Pat. No. 5,377,100. He teaches a method of encouraging attention by correlating video game difficulty with attention level. Pope's video game comprises a video display which depicts objects for interaction with a player and a difficulty adjuster which increases the difficulty level, e.g., action speed and/or evasiveness of the depicted object, in a predetermined manner. The electrical activity of the brain is measured at selected sites by an EEG. A Fast Fourier Transform (FFT) breaks down the generated wave to determine levels of awareness, e.g., activity in the beta, theta, and alpha frequency bands. A value is generated based on this measured electrical signal, which is indicative of the level of awareness. The difficulty level of the game is increased as the awareness level value decreases and vice versa.

Pope's computer games require sensing entire frequency bands, each as a stimulus, for control functions to play the game. Conversely, TCS teaches selection and utilization of one individual stimulus or more stimuli and considers the actual thoughts of the user. Many more forms of games and control systems are suggested with this application by utilizing virtually unlimited numbers and types of stimuli. Other forms of input to the computer can be performed with this method, such as described later. It can also be seen that entities or equipments other than computers can be controlled in a similar fashion, or that the computer can communicate with control peripheral equipment or other systems.

Another reference that is related to controlling a computer based on user physiology is U.S. Pat. No. 5,016,213 (Dilts et al.) which discloses a method and apparatus for controlling the position of an image on the screen of a computer using galvanic skin response (GSR), also known as Psycho galvanic reflex (PGR) or electrodermal reflex (EDR). In particular, the system teaches the introduction of a GSR amplifier circuit that couples to the game paddle port of a conventional computer, e.g., an Apple II computer. The GSR amplifier circuit is contained within a housing having GSR contacts that are located on the exterior of the housing for the user. When the user applies a finger to the GSR contacts, the GSR amplifier circuit utilizes the skin resistance available at the GSR contacts to create an electrical signal that changes in sense and amplitude directly with changes in the resistance sensed between the GSR electrodes. Furthermore, there is a product sold under the mark MINDRIVE™, by The Other 90% Technologies, Inc.™ of San Rafael, Calif. 94912-2669 which is believed to include a number of the features disclosed in U.S. Pat. No. 5,016,213 that is available for use with home computers. Among other things, MINDRIVE™ permits the user to operate a ski simulator, create art, a flight simulator, etc., on the computer using the GSR method. Conversely, TCS teaches the selection and utilization of one individual stimulus or more stimuli and considers the actual thoughts of the user.

Another feature to be found emanating from this TCS capability is personal identification from brain waves, not unlike the phenomenon of fingerprints, eye prints and voice prints.

OBJECTS OF THE INVENTION

Accordingly, it is the general object of this invention to provide an apparatus which addresses the aforementioned needs.

It is an object of this invention to provide an improved mechanism for controlling devices by thoughts in the human brain.

It is an object of this invention to provide an improved mechanism for the paralyzed to perform work or otherwise perform automated tasks such as computer operation.

It is an object of this invention to provide an improved mechanism for the quadriplegic person to put in a full days work such as at a computer, a production line control device, do visual sorting and other tasks.

It is an object of this invention to provide an improved mechanism for a person who cannot speak to communicate with automated speech from a speech synthesis device such as a computer.

It is an object of this invention to provide an improved mechanism for a paralyzed person to control automation in the home.

It is an object of this invention to provide an improved mechanism for a paralyzed person to control the movement of an automated wheelchair and other assistance devices.

It is an object of this invention to provide improved means for sensory inputs to computer systems.

It is an object of this invention to provide an improved mechanism for controlling devices by other than the human animal.

It is an object of this invention to provide an improved mechanism for reducing a persons delay in response time.

It is an object of this invention to provide an improved mechanism for increasing the speed of control operations.

It is an object of this invention to provide an improved mechanism for medical analysis and treatment involving multiple brain location involvement, i.e., audio perception of intelligibility and sound source direction are processed by different parts of the brain, either of which may be diseased.

It is an object of this invention to provide an improved mechanism for localization, detection and utilization of body stimuli.

It is an object of this invention to provide an improved mechanism to combat signal interference inherent in subject system.

It is an object of this invention to provide an improved mechanism to avoid inadvertent operation.

It is an object of this invention to provide an improved mechanism to combine artificial intelligence with body stimuli utilization.

It is an object of this invention to provide an improved mechanism to combine eye movement with body stimuli utilization.

Other objects and advantages of the present invention will be apparent and suggest themselves to those skilled in the art from a reading of the following specifications and claims, taken in conjunction with the accompanying drawings.

SUMMARY OF THE INVENTION

This invention is for controlling a computer by thoughts in the brain. It is primarily concerned with finding the radiating properties of the brain or results thereof and selectively applying these findings to the control of computerized devices. The primary mode disclosed accomplishes its purpose by accepting Magnetic Source Imaging (MSI) findings of the human body and selectively applying these findings to the control of other devices.

Human thoughts cause devices such as a Magnetic Source Imaging (MSI) to have an output which, when connected to a logic decision and control device such as a computer, can be interpreted to be the equivalent of pressing a key on a keyboard or clicking a mouse. Specific thoughts are used to produce outputs designated to do a specific function. These functions may include, for example, an input to execute an operation which, in turn, may accomplish results within or external to the computer. Human interaction between TCS and the user is by way of brain stimuli, display mechanisms, sound systems and others.

Wave patterns of specific body or brain locations are recorded along with the thoughts that produced them. By storing a description of these patterns in a data base, they may be retrieved for comparison and recognition and used to control a target device or system. Thus, predetermined computer operations can be selected and executed as a result of thinking "controlling" thoughts.

Initially, the state of the art may dictate that reliable control signals will be restricted to particular areas of the body or brain, rather than specific thoughts within these areas. That is to say, detection of brain activity may be limited to areas of speech, visual, motor, etc. As technology advances, more specific thoughts and desires may be reliably detected by TCS such that a greater number of stimuli may be employed by the user.

MSI has the ability to pinpoint spatial distribution of a magnetic field or stimulus. Used to display a visual image of the source location, it may assist the user in relating thought patterns to results obtained. MSI is noninvasive and can utilize stimuli from internal parts of the brain remote from the surface. This is more advantageous than EEG and EKG requiring surface electrodes or methods requiring invasive procedures.

TCS stores a history of the system operation, stimuli evaluation criteria, stimuli selection criteria and data for artificial intelligence functions, e.g., response time, aborts, corrections, accuracy, numbers of operations and so on to suggest improvements in performance, human factors, technology, software, stimulus detection accuracy, inadvertent operations and unexplained results. Aids such as biofeedback techniques, recorders, displays, sounds, etc. assist user to identify the TCS response which is coincident with his or her thought(s). The user discovers unique stimuli characteristics and candidates for stimuli selection.

The TCS is a tool for psychiatrists, psychologists and researchers to identify thought patterns and verify locations of the brain from which thoughts originate. The TCS explores brain activity and localization as well as enable correlation of stimuli with subjects' thoughts and feelings.

Psychological considerations dictate human factors engineering to be paramount when applying the TCS. The history of each stimuli causing thought is considered with the user's account of his or her feelings before accepting each stimulus. The user's nervous system and body functions are compared for coincidence with adverse conditions to avoid using detrimental stimuli. Analyses and summaries are produced for psychological experts and the user to investigate. Criteria of acceptance of thought stimuli are automatically suggested by TCS.

Artificial intelligence provides 1) pattern recognition for time correlation with appearance of other stimuli, 2) learning from past errors, 3) candidate criteria and acceptance criteria from the stimuli profile of thresholds encountered, 4) dependability rating of each stimulus, 5) games or exercises to determine reaction time and accuracy of each stimuli response, 6) periodic performance status, and 7) adverse results analyzes.

Auxiliary stimuli monitoring is provided to utilize body stimuli other than the brain. TCS may be used to substitute for diseased areas between the brain and other parts of the body. Helmet mounted sensors enhance the TCS for improved mobility and accuracy.

A better understanding of the present invention will be apparent to those skilled in the art when the following description of the best mode contemplated for practicing the invention is read in conjunction with the attached drawings. Numerical references relate to like elements in the drawings.

DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

This invention is primarily concerned with controlling a computer by thoughts in the brain. The mode described uses stimuli of the brain Via Magnetic Source Imaging (MSI) and selectively applies these findings to computer control. Other modes such as other detectable body emissions may be used as available. Wave patterns are recorded along with the thoughts that produced them. Specific thoughts are interpreted as functions to simulate a keyboard or a mouse.

Figure 1:
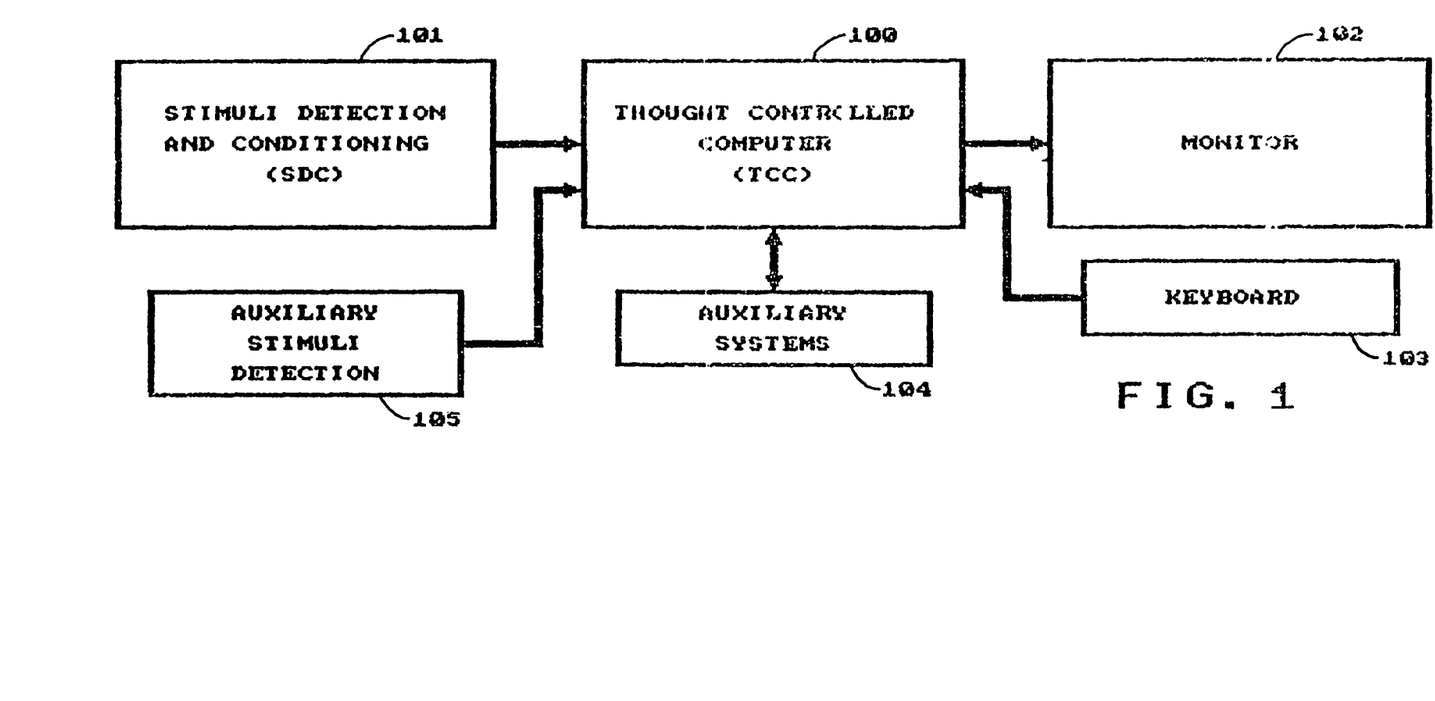
FIG. 1 is a block diagram illustrating the present invention as used to accomplish a thought controlled system.

Referring to the drawing, FIG. 1 shows the elements contained in the Thought Controlled System (TCS). Stimuli Detection and Conditioning (SDC) 101 performs the function of detecting energy given off by an animal, more particularly a human animal (the user). Magnetic Source Imaging (MSI) detecting magnetic energy given off by a human subject's brain (the user) is believed to be the best mode to teach this SDC 101 however the use of other modes, equipments or types of devices will become apparent and possibly preferable from an economic viewpoint prior to MSI cost reduction. The SDC 101 detects and conditions this stimuli by including, but not limiting SDC 101 to, amplification, filtering, shaping, noise reduction, focal accuracy, localization accuracy, etc. This is initially performed with state of the art techniques as referenced earlier in Background Of The Invention, thereafter incorporating advances in the art as they become available. These advances will increase signal reliability and the quantity of signals which can be used for control purposes.

Thought Control Computer (TCC) 100 receives SDC 101 output signals. The interface between TCC 100 and SDC 101 is typical of personal computer interface circuitry such as a parallel transfer, or bus transfer.

The monitor 102 initially displays a visual communication to the user with state of the art "computer-to-operator" communication. A keyboard 103 is used for installation, maintenance and, when necessary, for operation of TCC 100. Auxiliary systems 104 may be for any of a variety of applications inputted to, or controlled by, operations in the TCC 100. Auxiliary stimuli detection 105 is a custom or standard interface to make communication possible between TCC 100 and stimuli monitoring equipment as needed to augment SDC 101 capabilities (see alternate sources 214).

Auxiliary systems 104 provide a means for contributing alternate or additional inputs to the TCS. These may expand or increase the acceptance of brain stimuli or a particular body part stimulus in order to insure cost effectiveness, higher reliability, control or availability of stimuli. For example, auxiliary inputs may include environmental conditions, state of a switch, acoustic condition (noise, voice recognition), illumination condition (day or night), EEG monitoring, eyeball movement or movement of other body parts.

Auxiliary systems 104 may include the outputs as well as inputs. Auxiliary systems 104 may provide additional displays, control other body parts and combine with, or increase the quantity of, external systems controlled by SDC 101 outputs. Additionally, the user may wish to control such things as his environmental conditions, TV, telephone parameters or a computer-telephone interface.

To accommodate users with impaired sight or impaired hearing or even just to speed or accelerate the action between the TCS and the user, alternative outputs of auxiliary systems 104 may include: a) sound systems for the sight impaired, b) body stimulators operating similar to braille technology applied to finger tips or other parts of the body as the state of the art progresses, c) brain implants which stimulate specific brain activity, not necessarily unlike that used in brain surgery for stimuli location verification.

Auxiliary systems 104 and TCC 100 is designed commensurate with the state of the art implementation to utilize advances as they become available. TCS has the ability to accept other alternate sources from auxiliary stimuli detection 105 including but are not limited to signals received from EEG and EKG equipments.

Auxiliary stimuli detection 105 provides interface conversion to receive signals from other parts of the body by equipments specifically designed for measuring such emissions. This source of stimulus is used whenever practical to expand the number of stimuli available to the thought controlled system. One example is by indirectly detecting the results of brain stimuli by sensing the resulting action occurring at any part of the anatomy desired.

An example of discovering these areas is also covered as relating to additional stimuli. The method of uncovering and developing the most desirable stimulus may involve some form of feedback. The user views the results of his or her thoughts to determine the ease with which the stimuli can be produced and achieve the desired objects. In addition to voluntary muscles, some involuntary body actions may be used to control TCS by a user who has demonstrated sufficient biofeedback accomplishments.

Figure 2:
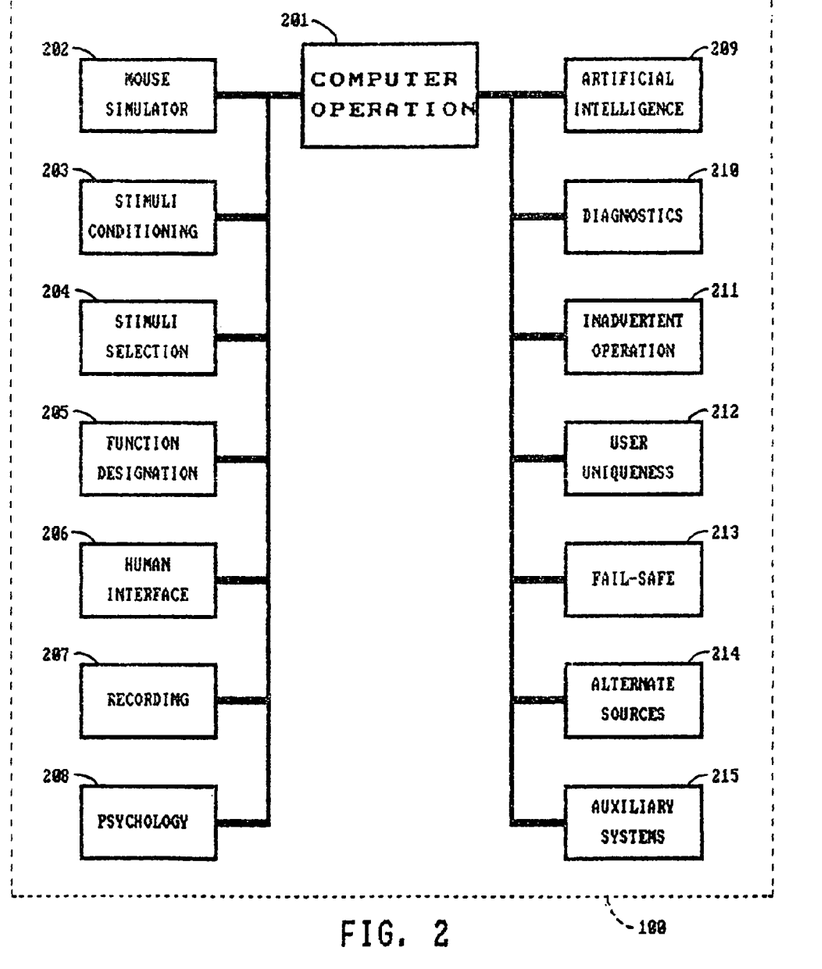
FIG. 2 is a block diagram illustrating the connections between the director and major functions of the Thought Controlled System (TCS)

Referring to the drawing, FIG. 2 shows the TCS operation as orchestrated by the computer operation 201. The computer operation 201 directs virtually everything that occurs or is going on in the TCS and may rely on additional computing, e.g., an internal math co-processor, an external computer of any appropriate size, etc. Elements of FIG. 2 are explained below in an appropriate order for system understanding.

FIG. 2, which is a type of flow chart, is also helpful in understanding the invention. It should not be assumed that because a flow chart is given that this invention is a computer program. While any digital encoding and decoding process can be implemented in a general purpose computer, the preferred embodiment of the invention may be a hardware configuration as shown in FIG. 1. To be sure, the hardware could be implemented in a microprocessor or, by the use of LSI, in one or more integrated circuit chips but the circuit diagram would remain essentially as represented in FIG. 1 along with many of the elements in FIG. 2.

A mouse simulator 202 is used in the TCC 100 to condition the inputs of SDC 101 data. This produces a format compatible with most personal computer input handling for optimum human factors. The TCC 100 then treats the signals similar to the way a computer treats signals from a mouse to initiate activity and cause feedback on monitor 102. Simulators are well known in the art and can be a simple look-up table or a complex array of indirect addresses as required. The concept is that each predesignated stimuli from SDC 101 will cause an input to the TCC 100 which will point to a memory location(s) which performs the same function as if striking a keyboard key, pressing a mouse key, moving the cursor or other functions as become useful to the user. Other means will become apparent to one skilled in the art for controlling a computer as covered later under eyeball movement and other user-to-computer control.

Stimuli conditioning 203 is performed by SDC 101 and TCC 100. The SDC 101 corrects or neutralizes interference which is acting on the signals received before passing the signals to the TCC 100. This interference may be of known or unknown origin. Interference of unknown origin is identified for the most part by source determination and isolation procedures. The TCC 100 may further improve or condition stimuli as necessary for optimum TCS operation. The heart, for instance, with its known characteristics, may have its interference removed from stimulus signals. An example of this prior art is an earlier (Pg. 7) Ref. to K. Abraham-Fuchs et al. Similar interference removal is accomplished in the telecommunications field by using echo cancellation techniques.

Stimuli signals are averaged, filtered, evaluated, enhanced and other processing as they progress through SDC 101 and TCC 100 to optimize response reliability. Discussed later are interference solutions, localization, recognition techniques identification and others. Speed and delay are issues which are closely related to reliability and the degree of control which a person has over particular thoughts. TCS receives selection limit variations from the designer, user or technician for trade-offs such as speed for accuracy, reliability, etc. This is particularly useful as the user is being trained on the system. For example, too rapid a response may be triggered by system noise or an inadvertent thought. Too slow a response may cause system sluggishness and present a longer opportunity for noise to cause misinterpretation of stimulus.

Localization, identifying location of stimulus source, is applied when the geometry of the body is known (Ref. U.S. Pat. No. 5,313,944 by Crowley et al.). Head position and intrabrain sector dimensions of each user are made available in a data base. TCS automatically adapts to head position variations for localization accuracy when the user's head is moved slightly. Adaptation of localization to different head positions is accomplished by comparing the actual head position with the data base position to create a virtual head position. Indexing head position is by identifying the location of specific stimuli or by identifying the location of detectable attachments on the head. Visual image displays of stimuli area are available as covered later. The capability and precedence for this is evidenced as " . . . priori information about anatomical or physiological constraints should be used to confine the solution" and " . . . method includes the reconstruction of focal activities . . . " Ref. W. Moshage, S. Achenbach, K. Gohl, W. Harer, S. Schneider and K. Bachmann MAGNETOCARDIOGRAPHY IN COMBINATION WITH MRI: VERIFICATION OF LOCALIZATION ACCURACY WITH A NONMAGNETIC PACING CATHETER, 1992 Elsevier Science Publishers B.V. and Ref. R. Graumann, K. Abraham-Fuchs, W. Moshage and S. Schneider, RECONSTRUCTION OF CURRENT DENSITIES WITH ANATOMICAL CONSTRAINTS, 1992 Elsevier Science Publishers B.V., Biomagnetism: Clinical aspects. M. Hoke et al. editors, and earlier (Pg. 4) Ref. to W. Moshage, S. Achenbach, A. Weikl. The use of spatially separated multiple channels is most helpful in localization for enabling a stimulus reading to be made from different angles. See earlier (Pg. 3) Ref. to W. Moshage, S. Achenbach. Statistical source distributions and source localization aid in identifying and correcting inadvertent or unexplained stimuli detection.

SDC 101 may be directed to specific sections of the brain by TCC 100 to avoid misreading unwanted stimuli, high risk areas, thought wandering consequences, etc. There may be thought stimuli at other places in the brain at the same time that the desired control stimulus is produced. This TCC 100 function avoids stimuli that are known to be of no use or requires multiple stimuli directions, therefore to providing a more reliable system. The method of identifying expected areas are accomplished in several ways. One is for the user to have the knowledge of the thought stimulus location in the brain and have the ability to indicate its location to the TCC 100. Another means to make such a decision is by artificial intelligence (IA) 209, discussed later, based on the user's stimuli profile as related to the anticipated direction by the user, i.e., which menu level is in use and the category of the task being performed.

TCC 100 may be assisted by auxiliary sensing apparatus such as may be connected via auxiliary stimuli detection 105. The TCS avoids misreading which may occur for other undesirable reasons by receiving timely alerts from within, or external to, the TCS, e.g. alerts of predetermined inhibitions known to affect proper operation. Examples of operation category candidates for inhibition are 1) known interference, 2) unsafe conditions, 3) memory deletes, 4) stimuli/result patterns which are still unproven and 5), others which may become apparent to a person skilled in the art. Previous work of localizing focal concentrations is discussed by H. Kober, et al using the dipole-density-plot (DDP). Ref. H. Kober, J. Vieth, P. Grummich, A. Daun, E. Weise, H. Pongratz; THE FACTORS ANALYSIS USED TO IMPROVE THE DIPOLE-DENSITY-PLOT (DDP) TO LOCALIZE FOCAL CONCENTRATIONS OF SPONTANEOUS MAGNETIC BRAIN ACTIVITY, Biomedical Engineering, October 1992.

There are times when received signals are confusing or insufficient to form conclusions about their meanings. Additional short term history and user statistical information is obtained from the data base to augment stimulus information for optimum interpretation of user's desires. For instance, when inconclusive signals are encountered, additional consideration is given to comparing the activity of other output signals of the SDC 101. Decision factors may include precedence of stimuli, sequence of stimuli, timing, magnitude and others as may occur to one skilled in the art. For instance, assume a previous output was from brain area A. Some time later area B becomes marginally active. The criteria for accepting B as a new stimulus to succeed A may depend on A getting weaker as well as B becoming stronger. Other examples suggest themselves later under inadvertent operation and thoughts that are suspected of occurring or being inhibited involuntarily.

Stimuli Selection 204 is paramount in the success of the TCS accomplishing its objectives. The time and effort spent on this is by no means wasted. The choices affect system reliability, ease of use, speed to be attained, and overall performance. The user's choice of his or her thought process for control is aided by a large data base of thought "triggers" containing but not limited to a complete word dictionary, sounds, pictures, smells and other means of thought provocation. A profile for each stimulus is maintained by stimuli selection 204. Data and criteria contributing to evaluation include but are not limited to: a) response time, b) dependability, c) time duration of each stimulus, d) stability of each stimulus, e) current and changing environment of the user, f) psychological status and mood of the user, g) total history and experience of target stimulus, and h) accuracy tabulation, how often stimulus was accepted, rejected, marginal or unstable.

The initial choice of stimuli to be used is restricted to the general and broad categories of dependability and simplicity of operation. They will be used for the keyboard arrow keys or movement of the mouse. General and broad categories of brain activity are initially interpreted as different sections or areas of the brain which are used for different functions. For instance, the motor section is involved with moving parts of the body. Using this as a starting point, TCC 100 is arranged to accept an appropriately strong signal from the motor section of the brain as a single control input. Secondly, the sense of smell of any odor, or easy-to-imagine odor, may cause a stimulus to be emitted from the sense of smell section of the brain. Third, the movement of an eye to the right may cause an easy to identify stimulus. Fourth, the movement of an eye to the left may cause an easy-to-identify stimulus. And fifth, the movement or activity that has been found to be the most controllable response under feedback experimentation would be the fifth and presumably the most reliable stimulus of the five, at least for this scenario. When these five are found to be sufficiently dependable, the first four will be assigned to the four arrow keys of a keyboard or control directions of a mouse. The fifth will be assigned to the mouse activation button. Therefor the user will be able to control the operation of most "Windows" type programs.

More localized stimuli within the brain are the next phase for acquiring thoughts for TCS operation. Some specific brain functions which stimulate recognizable SDC 101 outputs are the user's concentration on: 1) the thought of saying a particular word, 2) visualizing a simple article or 3) action type thinking of a particular muscle movement, i.e., foot, arm, hand, finger, etc. Whether or not the body movement actually occurs may not be important. Other thought stimuli may be explored for control including but not limited to the equivalents of being chilled, frightened, startled, happy, joyful, etc.

Because involuntary thoughts may cause problems, TCS records the occurrence of inadvertent action and the user should be encouraged to find thoughts which are unencumbered with coincident detrimental radiation. As he or she obtains more experience with the TCS and action thoughts that are very deliberate, as opposed to emotional and sensory thoughts, the user's thoughts will have more of a quality of being reliably voluntary. These are the type thoughts that are expected to be most generally selected by the user during system evaluation and setup. Aids are provided for this as covered under recording 207.

Stimuli selection 204 criteria for each profile entry is in terms of strength of signal and correlation factor with other entries as described according to function designation 205 below. The user combines his or her own feelings with entries in the profile in order to effect choices that produce optimum reliability.

Guidelines for thought selection and designation are as follows: a) read stimuli and record results user thoughts, b) choose familiar human factors, such as person/computer interface, c) using completely free thinking, explore optimum and efficient methods of human thinking concepts for interactions with TCS, d) analyze stimuli locations, patterns, differences, similarities, frequency, response time and duration characteristics, e) use statistics and Artificial Intelligence 209 as part of analysis, f) categorize stimuli profile and characteristics using various methods including techniques not unlike phonemes in voice recognition and voice print technology, g) compile and analyze data for each individual user (this data is then inspected for patterns such as grouped similarities).

User thoughts may be something other than the computer function he or she wishes to perform. Therefore the user may need to perform a translation in his or her mind. As the technology advances such that precise thoughts are detected, the actual thought of the desired function will be reliably detectable and a thought stimulus designated.

Function designation 205 and descriptions will depend largely on the user's choice as the way to relate to the stimuli. The types of thoughts are mentioned along with stimuli selection. The user's designation and description are recorded in the related stimulus profile using means such as keyboard 103 by the trainer, human interface 206 or additional inputs as available. The designation serves as a key to access the profile. Stimuli profile contents includes but is not limited to designations, descriptions, definitions, function, location, characteristics and: a) stimuli candidate criteria, b) stimuli acceptance criteria, c) expected interference to specific stimulus, d) counter-interference applicable to specific stimulus, e) cross reference for similarities, f) tally of thresholds encountered such as accepted, marginal, submarginal, complete absence of signal and number of attempts to tally: all thought detection, common mistakes encountered, user iteration needed vs. performed, and log references.

TCS feedback to the user is consistent with good human factors; Each stimulus or group of stimuli is identified with a unique designation so that the user can associate stimuli with his or her (related) thoughts. TCS provides for designations of the user's choice to be displayed or otherwise communicated to the user. For example, TCS may display related predetermined pictures or the brain pictorially with the location of each stimulus received. The user may choose a display of the entire brain or a part thereof. The user makes the final choice as to which designation will identify which of the stimulus, or group of stimuli, is used to evoke a particular function of the computer. This information is recorded in the stimuli profile. Displays and user's contribution to the stimuli profile is explained later.

A TCS configuration is evaluated for each user in terms of the quantity and quality of signals needed for optimum control. Means of assessing quality of signals is more detailed in artificial intelligence 209 and inadvertent operation 211. Individual user characteristics are established to identify the most desirable stimuli of each user to accomplish the optimum system configuration. The user's stimuli profile expands as he or she begins to recognize and control various thoughts which invoke TCS responses. Consequently, the user expands control of TCC 100 as well as what TCC 100 recognizes.

In some cases the user is required to produce two sequential thought signals rather than one in order to avoid errors, i.e., the ALT or CTRL key usage on a computer keyboard. Another expansion of methods of control and reliability is to require two of the same stimulus (double strike) to activate a function. The user will also identify several "easy to originate" stimuli which perform functions such as the escape, enter and TAB keys.

Control functions can be combined sequentially to obtain more functions and improved reliability. This is accomplished by designating one or more preceding stimuli to perform a form of an escape or directing function. Different or additional functions are obtained by changing the meaning of stimuli used to represent a different function. The reliability of each function is investigated and determined by artificial intelligence 209 and stimuli selection 204.

The simultaneous use of ALT or CTRL keys with another key may expand the number of input controls obtainable from a given number of stimuli. In addition where two stimuli sources are found to be associated and always coactive, the uniqueness of this stimuli will provide increased dependability. One example of multi-location stimuli occurring is for instance, the interpretation of sound occurs at multiple places in the brain where sound source direction and message content are determined separately.

Human interface 206 accommodates interaction between the user and the TCS occurs in a number of ways. Stimuli from the user is one way of communicating TO the TCS.

Additional communication TO the TCS may include eye movement, voice via a sound system and speech to text conversion and others. Communication FROM the TCS includes the monitor 102, a sound system and others. It is expected that a wide variety and more improved communication means will be incorporated as the art advances.

A menu is provided by monitor 102 for communication with the user. The menu will have 1 to n entries, which may be limited by the number of distinct stimuli available to a particular user or by the physical limitations of displaying various size formats.

The user may make a selection subsequent to the first menu by viewing a drop down menu associated with the first selection. A tertiary selection may be available, in which case a sideboard menu appears on the screen and the user will choose the desired function from the tertiary menu, and so on when desired.

Displays on monitor 102 provides feedback for the user to readily grasp the details and overall affect of his stimuli on system operation. This educates the user as to his ability to control the TCS as well as to solicit the user's creative ideas of innovative thought patterns for improved performance. Some examples of presentations are: a) selectable display of graphs in optimum human factors format to show stimuli data base summaries, b) an automated differentiation list showing the relative ease to produce each stimuli; c) brain pictures showing the named areas and exact stimuli location of, e.g., stimulus being used, all stimuli emitting from the brain and portions of stimuli being used in particular sections; d) pictorial views of use visualization as inputted by the user, e) displays as needed by the user for biofeedback effects which may help the user with further knowledge to create stimuli, and f) three dimensional pictorial view of the brain showing all or a selected display of stimuli.

The pictorial display is rotatable for three dimensional perception of all stimuli involved and includes a flashing indication of the specific stimulus that is under consideration. The display has zoom capabilities such that the viewer can choose optimum magnification for purposes of visualization. This visualization will be of great assistance to the user to produce meaningful and reliable stimuli. The information needed to produce three dimensional pictorial views will be obtained from SDC 101 which may rely on the characteristics of magnetic source imaging or other appropriate equipments to produce such information.

A sound system may provide a human factors interface which accepts analog or digital sound sources. Input may be analog voice which is converted to digital voice and then to text or other convenient form for TCC 100 manipulation. The text is displayed on the monitor 102 for the user to edit and store in its appropriate stimulus memory location. Searching may be performed on the speech originated text for words to simulate a function control signal that was caused by a particular thought. For instance, the words "up", "down", "right" and "left" may be predetermined by the user to be equivalent to mouse control or the "arrow" keys of a keyboard.

Eyeball movement and position sensing can be used advantageously by TCS to move the cursor of monitor 102 up, down and sideways. The movement is analogous to the hand moving the mouse to effect cursor movement on monitor 102. The optimum correlation of the eye with the cursor places the center of focus of the eye relative to the target on the screen of monitor 102.

Correlation of the center of eye focus and position of the cursor is done by the user indicating the deviation from where he or she thinks it should be. This is done by using a horizontal and vertical adjusting scale shown on monitor 102 screen for pointing to the desired correction factor. The user then clicks on the suspected deviation. Additional eye positioning technology Ref. is "Beyond 2000, Episode 205" viewed on Discovery TV channel, Feb. 9, 1996 at 9:00 PM. Re. the latest CANNON Camcorder automated focus.

One of the considerations for eye movement to control the monitor 102 cursor is ease and accuracy with which the user can control his or her thoughts. The speed with which the TCS can be utilized is limited by the response time of the user. With eye movement sensing and choosing stimuli which are found to be quick to respond, the TCS can accomplish very high speed operation.

After manual setup is accomplished, automatic fine tuning adjustment is provided to maintain TCC's 100 perception of the head as being in the same position at all times. A head position sensor is used for adjusting the fine tuning when head movement occurs. Alternatives for head movement sensing (see eye movement and helmet systems later) uses techniques similar to virtual reality systems to sense movement of the helmet and therefore movement of the head.

Recording 207 stores in the data base records for example operation history, stimuli evaluation criteria, stimuli selection criteria and data for artificial intelligence functions, e.g., response time, aborts, corrections, accuracy, numbers of operations and so on. Experience with these features will suggest improvements in performance, human factors, technology, software, stimulus detection accuracy, etc.

A record is kept of all factors regarding occurrences of inadvertent operations and unexplained results. A determination is made by artificial intelligence basing conclusions on factors such as abort or corrective efforts made by the user, i.e. cancel, undelete or escape functions. Analysis is made of action immediately preceded execution of inadvertent operations and unexplained results. Unusual sequence of events and unrecognizable stimuli are each given an identification, compared for reoccurrence and counted.

The accuracy portion of recording 207 receives inputs of incomplete conclusions from TCC 100 and by the user alerting TCC 100 when experiencing a response other than expected. Accuracy deviations (see involuntary thoughts described earlier) and associated scenarios are displayed on demand. As the TCS is further developed, more automated means of detecting inaccuracies will become apparent. One method is for the expected input patterns to be recorded, compared, and correlated by artificial intelligence 209, addressed later, for each user stimulus as it is received.

Statistics from recording 207 are formulated and summarized by the TCC 100 in order to 1) study effects of the TCS, 2) improve TCS quality and user acceptance, 3) publish statistics subject to release by users and 4), facilitate artificial intelligence.

Psychology 208 mainly represents considerations which regard human factors to be paramount when applying the TCS. Because of the possibility of a user causing a thought stimulus involuntarily or accidentally, the TCS should not be exposed to any potentially dangerous possibilities. The history of each stimuli-causing-thought is considered with all the data base recordings and the user's account of his or her feelings before using that thought stimulus. Feelings to be avoided are ones that may be linked to a loss, unpleasantness or thoughts and feelings that cause stress in the user. The user's related body functions are recorded and compared for coincidence with expected parameters or adverse readings. Analyses and summaries are produced for interaction with psychological experts for this and other conditions the user may need to have investigated. After user analysis, criteria of acceptance of specific categories of thought stimuli are automatically recorded by TCC 100 and displayed when requested by the user.

User analysis is performed to determine the psychological impact of TCS including, but not limited to, thoughts, words, pictures, nervousness, discomfort, uneasiness, anger, pleasantness, joy, laughter, physical response, etc. The initial user evaluation performed on a TCS includes aids such as biofeedback techniques, body function recorders, displays and various equipments to discover user's unique stimuli characteristics. The user utilizes the TCS to display suggested images for which the resulting outputs may be obtained. The results may be shown with but not limited to monitor 102 or sound system under human interface 206. Other associated medical instruments are but not limited to auxiliary stimuli detection 105 and auxiliary systems 104, i.e., strip chart recording of selected stimuli. The display of candidate thought stimuli are for stimuli selection discussed earlier in this application.

A data base is compiled with entries of known stimuli or combinations of stimuli representative of, or characteristic of, these "psychological impact" thoughts. These are compared with stimuli received and utilized to assist in selection of candidate stimuli. The TCS receives and suggests images, sounds, etc. of thoughts which cause stimuli. The TCS also provides images, sounds, etc. which may provoke thoughts that produce usable stimuli. These are also used on an alarm basis, information basis, user evaluation and other purposes as suggested by advances in the art.

Confidentiality and operational reliability is maintained by recording and storing all information in secure files. Access and use of various levels of classifications may be controlled by security codes, passwords, mechanical locks, etc.

The TCS is a tool for psychiatrists, psychologists, researchers and others to identify thought patterns or to learn and verify locations of the brain from which thoughts originate. The TCS explores body and brain activity and localization as well as enable correlation of stimuli with user thoughts and feelings.

Artificial intelligence 209 (AI) utilizes TCS data bases and artificial intelligence 209 algorithms, i.e., stimuli conditioning 203, stimuli selection 204, function designations 205, recording 207, psychological 208 considerations, etc. Artificial intelligence 209 has the ability to go further into solving problems than conventional data processing. AI applies reasoning and a higher sense of logic than is ordinarily employed in computer operation. In this sense TCS performs as many functions as possible toward accomplishing and enhancing the TCS mission. Therefore, TCS' ability is carried to a higher plateau, i.e. with Artificial intelligence 209, achieving a refined capability that would not otherwise be realized. Artificial intelligence 209 tasks include but are not limited to: a) recognize and analyze patterns for such things as consistent signal strength, time correlation with other events, stimuli, user mood, consideration of user desires and reactions in the past, etc., b) record and analyze stimuli that are not used but rather have a coincident appearance with selected stimuli or coincidence with other TCS events, c) improve analysis with AI knowledge and capability, d) alert user to unique and significant patterns, e) integrate the record of user action with statistics and graphs to display, suggest, stimulate ideas, etc., f) record results to utilize, analyze and implement improvements, g) learn from past errors as determined from statistics, h) maintain stimuli profile data base, i) determine candidate criteria and acceptance criteria from the stimuli profile of thresholds encountered, j) continually add to the dependability rating of stimuli with each successful use, not unlike the use of positive reinforcement with humans, wherein success is subjective and ranges from the simple acceptance to an averaging over time of completion vs. escape criteria, k) determine the positive and negative potential of the existence of inputs (see eye blinking artifacts and user uniqueness), l) provide the user with a game or exercise to determine aptitude, reaction time, accuracy, etc. of each stimuli response, m) record the user's preference of which stimuli offers the most control with the most ease, n) provide user status of what artificial intelligence determines the user performance to be, o) analyze and categorize inadvertent operation and unexplained results in the log, and p) analyze and categorize head and eye movement implications.

Diagnostic 210 features are commensurate with the state of the art to identify faulty conditions, take corrective action and verify operation. Under automatic or manual control, diagnostic 210 functions toward correcting malfunctions in TCS depending on the quality of artificial intelligence. TCS includes but not limited to a diagnostic operation to suggest a remedy, provide a recommendation and wait for the user's approval. Manual efforts before or during the diagnostic operation include retry, reassign stimuli, explore alternative stimulus, etc. A record is made when the user action implies the need for change or correction, i.e., restarts, retrace steps and/or experiences undesirable results.

Inadvertent operation 211 guards against undesired and inadvertent operation. One of the ways for guarding against this is to display additional stimuli on demand by the TCC 100 including signal characteristics, e.g., magnitude, period, frequency, etc., needed to identify known control stimuli. The user may select one or more of these stimuli. Each operation will be classified as either the safe or potentially dangerous consequences. Classifications given to avoid undesired and inadvertent operation are: a) first discovered and used without being tested, b) used after a predetermined number of successful uses (on a game, trial or exercise basis), and c) used after being approved by a qualified evaluator.

User uniqueness 212 is addressed because each user exhibits some stimuli characteristics that are different. Each user is likely to cause a certain amount of unique interference. The uniqueness of some interference signals of each subject has a disadvantage and an advantage. A disadvantage is that it may take additional time to isolate and identify the stimulus because of its uniqueness. Conversely, once identified, this user's unique brain/thought characteristics may contribute to a more positive identification of specific stimuli. Such a positive identification may be particularly attractive in a clinical environment when user unique data bases are involved.

For multiple users, the TCS creates a data base for each user. A portion of recording 207 establishes a unique user profile. Examples are that it accumulates terms, records words relating each user stimuli, how often items are used, etc. In addition, identification of the user can be performed from brain stimuli to automate security and data base selection, i.e., fingerprint and voice prints alternatively identify individuals.

Fail-safe 213 is a part of the system such that when a power failure, system failure, human failure or other failures occur, 1) a recording of system status is made, 2) the current job parameters are saved and 3), a graceful shutdown of the system is effected. Shutdown should be the easiest and most reliable stimulus for the user to produce. It is chosen with the goal of being easily controllable and being the equivalent of a manual emergency button. When a TCS application involves the possibility of disastrous results due to a system failure or by inadvertent operation from any other cause, a shutdown is caused. In order to design and implement an alarm and automatically shutdown, all possible scenarios are identified, stored and monitored. A selection is then made as to which scenarios will trigger automatic shutdown. Manual intervention of this feature is possible at all times.

Alternate sources 214 processes stimuli obtained from equipments outside the TCS, particularly in the time period before MSI equipment development has made it the most cost effective for the quality obtained. These stimuli are considered for use in concert with SDC 101, particularly in light of user capabilities, or lack thereof. Most parts of the human body e.g., muscles, brain, organs, stomach, etc. emit sufficient magnetic radiation to be detected and measured without the connection of electrodes. There may be applications where an SDC 101 function is better accomplished by sensing muscle emissions, by radiation, conduction, chemical or whatever sensors are found to be optimum. These are usually as a result of brain activity.

Auxiliary systems 215 is the portion of TCC 100 which interfaces with and supports auxiliary systems 104 and is designed commensurate with the state of the art implementation to utilize various equipments as they become available.

Figure 3:
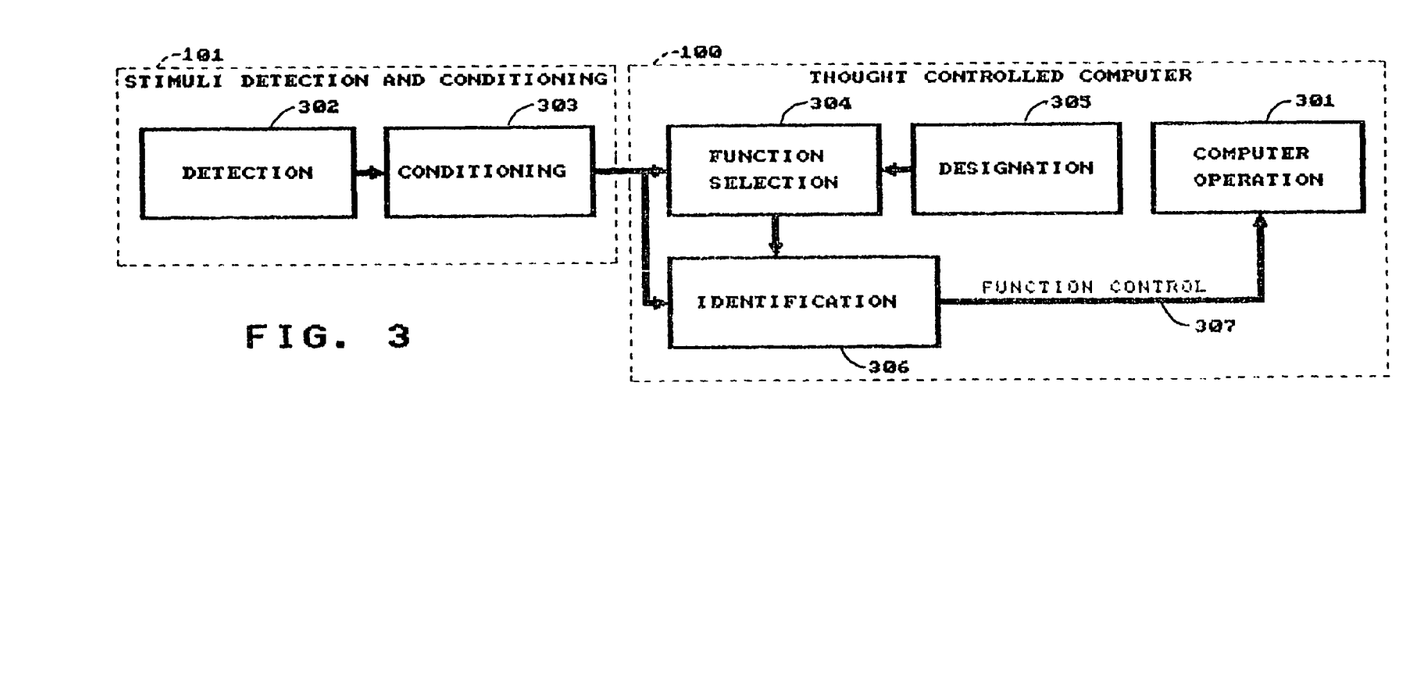
FIG. 3 is a block diagram illustrating the connection of TCS elements which process detected stimuli through to computer operation.

Referring to the drawing, FIG. 3 shows the basic elements of handling body stimuli from detection 302 through to computer operation 301. Detection 302 and conditioning 303 perform the stimuli detection and stimuli conditioning described for FIG. 1 SDC 101 to produce conditioned stimuli. This performance is considered successful when conditioning 303 output conforms to the criteria of earlier described stimuli selection 204.

All successfully conditioned stimuli are retained, recorded and tagged. Each tagged conditioned stimulus is communicated to the user for consideration and correlation with the user's perception of the stimulus origin. With TCS' help, the user inputs an appropriate designation into designation 305. User selection of conditioned stimuli is described earlier in stimuli selection 204 and function designation 205. Note that not necessarily all tagged conditioned stimuli are given user designations. As computer operation functions are needed, a function is assigned to an appropriately designated stimulus or group of stimuli and recorded in related profile within function selection 304.

Accordingly, progressive steps are taken toward assigning a conditioned stimulus to an operational function and recording them in stimulus profiles. During TCS operation, identification 306 compares each conditioned stimulus outputted from conditioning 303 with the conditioned stimuli in the profiles of function selection 304. When identification 306 finds a match, the associated function is sent via function control 307 to computer operation 301.

TCS may be used to substitute for diseased intermediate areas in the communication path between the brain and a body part to be controlled, e.g. an arm or leg muscle. TCS bridges the gap between the brain and a part of the body which appears to be paralysed. This is accomplished by utilizing state of the art equipment to: a) monitor and record the stimuli which normally arrives at (and controls) the target body part and b) equipment with an output capable of simulating the appropriate stimuli as directed by the brain Via SDC 101 and TCC 100.

The information used to perform these functions are signals sent from the brain and stimuli to control target paralysed body part. The equipment needed to furnish the stimuli required by said body part may be applied invasively or noninvasively. Additional features may include but are not limited to miniaturization, battery powered, fail-safe radio controlled, etc.

As technology progresses, a radio or wire connection will become available to a miniaturized unit located at the brain. This may be applied invasively or noninvasively depending on risk, cost and performance factors. The miniaturized unit is suggested to be located near the section of the brain that is related to the stimuli desired and may require special features, e.g. shielding. Such locations may overcome present day need for MSI shielded rooms, isolated power, etc. by having less interference, stronger signals, more applicable signals, less unwanted signals, less false signals and the presence of stimuli uniquely applicable to the function to be performed. The uses of this are many but one obvious application example is to control an arm or leg prosthesis using the phantom thoughts and feelings which often accompany an amputation. This miniaturized brain unit performs functions of SDC 101.

Economies can be effected when the user has minimal requirements by using only the essential components to accomplish the mission. Applying a user training system, TCC 100 provides an output record of the equipment required for each function used thereby the resultant configuration can be minimized. For instance, 1) a scaled down version may be capable of detecting only the few stimuli required to perform minimal functions, or 2) when user training is completed, much equipment may be removed from the system. Some equipment, e.g. monitor 102, keyboard, etc., may be reconnected for training and maintenance purposes. Further economies may also be effected by using single two dipole model techniques. The trade-off depends on the objectives and preliminary examination findings. Ref. J. Vieth et al, MAGNETIC INTERICTAL EPILEPTIC BRAIN ACTIVITY LOCALIZED BY USING THE SINGLE OR THE TWO DIPOLE MODEL, Biomedical Engineering, October 1992.

Artifacts, as explained above, within the stimuli signals may AID or hinder successful stimuli utilization. Artifacts of the heart may cause interference to stimuli utilization. Such artifacts are usually detected and effectively removed during the stimuli conditioning process. On the other hand as usable stimuli, the multiple blinking of the eyes may precipitate helpful artifacts. (Eye blinking causes EEG responses) "... in the posterior parts of the brain about 200 ms after (eye) blink artifacts" from Riitta Hari, Human cortical functions revealed by magnetoencephalography, Progress in Brain Research, Vol. 100, 1994 Elsevier Science B.V.

Helmet mounted SQUIDs, or an improvement thereof, will provide better localization accuracy and user mobility as technology advances. The helmet may have a small optical fiber cable connected to the user's chair or bed where signals are converted to higher outputs and forwarded to the main system. Some electronics today are proving that cryogenic cooling may not be necessary. The helmet itself may be used inside a shielded room, or the helmet could be used instead of a shielded room. Ultimately, a wireless system may be explored as technology grows.

There is a need to anticipate future developments and enhancements of the TCS. Present day MSI technology requires large machinery, a shielded room and specially cooled circuitry. As more and more SDC 101 equipment is placed in service and as the race for economic feasibility and technical advancements are pursued, this invention becomes more attractive. Publications say the race is on among many companies to bring MSI technology to a stage where it is miniaturized, inexpensive and insensitive to interference. As the technology progresses, the detector coils and the SQUID chips, as well as the required shielding, may be contained within a helmet or innovative alternatives may appear. The TCS may be augmented with such capability as the need arises and as technology advances.

When specific thoughts are found to be dependably under the control of the user, such thoughts can be assigned to initiating tasks which are intolerant to false or inadvertent activation. This dependable thought/stimulus is a good candidate to be used to trigger an operation for which speed is a significant attribute. Examples of speed advantage are: production line tasks, games, word processing (typing), weapons firing, etc. This phenomenon will aid with research regarding brain activity, brain speed, related response times, and psychiatric analysis.

It is well known that the more primitive parts of the human brain are very similar to non human animal brains. Control of basic body functions are similar, particularly in terms of their location within the brain. Except for the animal's ability to verbalize, much TCS theory can be applied to an animal brain controlled system.

An unattended animal may be cared for by applying a TCS. For instance, the control by an animal of a doorway to the outside without the need of a trainer. An animal and the animal's trainer together perform as the "user". The animal trainer assists with TCS interface as needed, particularly during training and maintenance. A miniaturized SDC 101 unit monitors the animal's thought patterns and stores thought history for a relatively short time, e.g. one half minute. For example, when the animal goes to the door wishing to "go out," the trainer activates the unit to permanently store these thoughts which accompanied the desire of the animal to go out.

After repeated occurrences of permanently storing these pertinent thought patterns, a search is made to find the common stimuli which occurred in all these instances. These "common stimuli" patterns are then compared with the short term history monitoring as it occurs in real time. The trainer is alerted each time a true comparison is made and the trainer evaluates whether the alarm is truly the targeted purpose for monitoring the thoughts.

Short term history monitoring is continued and statistics are gathered regarding all alarm indications, the associated stimuli and the correspondence to the desired results. Other needs for an animal accompanied by a trainer use features of TCS such as to control their environment. These include but are not limited to obtaining drinking water, obtaining food, record danger on a remote device, communicate information over a telephone line, point a video camera with the animal's line of sight (see eye movement), etc.

Many scenarios are given in this application which may suggest and provoke other modes and systems. Although this specification describes Thought Controlled System using Magnetic Source Imaging and detecting magnetic energy given off by a human subject's brain, it can be seen that the theories described equally apply to other networks and other forms of stimuli detection and control systems.

TCS performs the function of detecting energy given off by an animal, more particularly a human animal (the user). Energy given off by a human subject's brain (the user) is believed to be the best mode to teach this invention however the use of other animal subjects, modes, equipments, devices, users, etc. may become apparent with advances in the state of the art.

Without further elaboration, the foregoing will so fully illustrate my invention that others may, by applying current or future knowledge, readily adopt the same for use under various conditions of service.

I claim:

1. An apparatus for controlling a computer operation based on one or more stimuli sensed from at least one user thought, said apparatus comprising:
    (a) stimuli input means coupled to the user for detecting at least one stimulus being caused by the at least one thought of the user;
    (b) a computer having an operating system, coupled to said stimuli input means, for processing said at least one stimulus to produce a function control signal to control the operation of said computer wherein said computer does not require an articulated response from the user, said computer comprising:
        (1) function selection means for receiving said at least one stimulus and wherein said function selection means comprises a memory including a correspondence between a plurality of previously-stored user stimuli and a plurality of desired function control signals;
        (2) identification means, coupled to said function selection means, for comparing said at least one stimulus to said correspondence to identify a function control signal corresponding to said at least one stimulus, said function control signal being transmitted to the operating system of said computer.

2. The apparatus of claim 1 wherein said stimuli input means comprises magnetic source imaging means.

3. The apparatus of claim 1 further comprising auxiliary stimuli input means, coupled to said computer, for providing additional or alternative stimuli inputs from the user using equipments capable of measuring such emissions.

4. The apparatus of claim 1 further comprising communicating means, coupled to said computer, for communicating information pertaining to the user's thoughts.

5. The apparatus of claim 1 wherein said computer further comprises designating means coupled to said function selection means, said designating means permitting the user to designate a particular representation to be associated with said at least one stimulus.

6. The apparatus of claim 1 wherein said stimuli input means comprises conditioning means for conditioning said at least one stimulus for use by said computer.

7. The apparatus of claim 1 wherein said computer further comprises a database for storing inaccuracies regarding said correspondence between said plurality of previously-stored user stimuli and said plurality of desired function control signals.

8. The apparatus of claim 1 wherein said computer further comprises respective data bases for storing user unique stimuli from respective users, said user unique stimuli being usable by said computer for security or identification of users.

9. The apparatus of claim 1 wherein said computer further comprises stimuli selection means for selecting stimuli from the user based upon acceptance criteria to form said previously-stored user stimuli.

10. The apparatus of claim 1 further comprising means for detecting coactive stimuli for increasing the dependability of said function selection means.

11. The apparatus of claim 1 further comprising means for detecting sequential stimuli for increasing the dependability of said function selection means.

12. The apparatus of claim 1 further comprising localization means for identifying locations in the user of the source of said at least one stimulus.

13. The apparatus of claim 12 further comprising adapting means for adapting said apparatus to a change of location of the source of said at least one stimulus whenever the user moves.

14. The apparatus of claim 1 further comprising bodily communication means, said bodily communication means being adapted to be coupled to the user, or within the user, to provide for a communication path for said at least one stimulus between the user's brain and a user body part to be controlled.

15. Apparatus for controlling computer operation from one or more stimuli sensed from one or more thoughts in a user's body, said apparatus comprising:
(a) detecting means for detecting said one or more stimuli sensed from said one or more thoughts to produce one or more detected stimuli,
(b) selecting means for receiving one or more of said detected stimuli to perform a function and selecting a correspondence to one or more user thoughts to produce a selected function and wherein said selecting means does not require an articulated response from the user,
(c) identification means for identifying one or more said detected stimuli as corresponding to said selected function for producing a function control signal,
(d) receiving means for receiving said function control signal for said controlling said computer operation.

16. An apparatus for controlling a computer operation based on one or more stimuli sensed from at least one user thought pattern, said apparatus comprising:
(a) stimuli input means coupled to the user for detecting at least one stimulus being caused by the at least one thought pattern of the user;
(b) a computer having an operating system, coupled to said stimuli input means, for processing said at least one stimulus to produce a function control signal to control the operation of said computer wherein said computer does not require an articulated response from the user, said computer comprising:
(1) function selection means for receiving said at least one stimulus and wherein said function selection means comprises a memory including a correspondence between a plurality of previously-stored user stimuli and a plurality of desired function control signals;
(2) identification means, coupled to said function selection means, for comparing said at least one stimulus to said correspondence to identify a function control signal corresponding to said at least one stimulus, said function control signal being transmitted to the operating system of said computer.

17. Apparatus for controlling computer operation from one or more stimuli sensed from one or more thought patterns in a user's body, said apparatus comprising:
(a) detecting means for detecting said one or more stimuli sensed from said one or more thought patterns to produce one or more detected stimuli,
(b) selecting means for receiving one or more of said detected stimuli to perform a function and selecting a correspondence to one or more user thought patterns to produce a selected function and wherein said selecting means does not require an articulated response from the user,
(c) identification means for identifying one or more said detected stimuli as corresponding to said selected function for producing a function control signal,
(d) receiving means for receiving said function control signal for said controlling said computer operation.

18. An apparatus for controlling a computer operation based on one or more stimuli sensed from at least one user thought category, said apparatus comprising:
(a) stimuli input means coupled to the user for detecting at least one stimulus being caused by the at least one thought category of the user;
(b) a computer having an operating system, coupled to said stimuli input means, for processing said at least one stimulus to produce a function control signal to control the operation of said computer wherein said computer does not require an articulated response from the user, said computer comprising:
(1) function selection means for receiving said at least one stimulus and wherein said function selection means comprises a memory including a correspondence between a plurality of previously-stored user stimuli and a plurality of desired function control signals;
(2) identification means, coupled to said function selection means, for comparing said at least one stimulus to said correspondence to identify a function control signal corresponding to said at least one stimulus, said function control signal being transmitted to the operating system of said computer.

19. Apparatus for controlling computer operation from one or more stimuli sensed from one or more thought categories in a user's body, said apparatus comprising:
(a) detecting means for detecting said one or more stimuli sensed from said one or more thought categories to produce one or more detected stimuli,
(b) selecting means for receiving one or more of said detected stimuli to perform a function and selecting a correspondence to one or more user thought categories to produce a selected function and wherein said selecting means does not require an articulated response from the user,
(c) identification means for identifying one or more said detected stimuli as corresponding to said selected function for producing a function control signal,
(d) receiving means for receiving said function control signal for said controlling said computer operation.

* * * * *